United States Patent
Hyodo et al.

(10) Patent No.: US 9,880,424 B2
(45) Date of Patent: Jan. 30, 2018

(54) LIQUID CRYSTAL DISPLAY PANEL

(71) Applicant: Japan Display Inc., Minato-ku (JP)

(72) Inventors: Yosuke Hyodo, Tokyo (JP); Yasushi Tomioka, Tokyo (JP); Takenori Hirota, Tokyo (JP)

(73) Assignee: Japan Display Inc., Minato-ku (JP)

( * ) Notice: Subject to any disclaimer, the term of this patent is extended or adjusted under 35 U.S.C. 154(b) by 63 days.

(21) Appl. No.: 14/963,624

(22) Filed: Dec. 9, 2015

(65) Prior Publication Data

US 2016/0178943 A1 Jun. 23, 2016

(30) Foreign Application Priority Data

Dec. 19, 2014 (JP) ................................. 2014-257857

(51) Int. Cl.
- *G02F 1/1339* (2006.01)
- *G02F 1/1333* (2006.01)
- *G02F 1/161* (2006.01)
- *G02F 1/01* (2006.01)

(52) U.S. Cl.
CPC ...... *G02F 1/1339* (2013.01); *G02F 1/133345* (2013.01); *G02F 1/161* (2013.01); *G02F 1/0107* (2013.01)

(58) Field of Classification Search
CPC .......... G02F 1/133345; G02F 1/13394; G02F 1/161; G02F 1/0107; G02F 1/1339
See application file for complete search history.

(56) References Cited

U.S. PATENT DOCUMENTS

| 2014/0022478 A1* | 1/2014 | Kim ..................... G02F 1/1339 349/43 |
| 2014/0043574 A1* | 2/2014 | Ichimura ............... G02F 1/1339 349/138 |
| 2014/0092351 A1* | 4/2014 | Hatakeyama ......... G02F 1/1339 349/106 |

FOREIGN PATENT DOCUMENTS

| JP | 10-232404 | 9/1998 |
| JP | 2003-43493 | 2/2003 |
| JP | 2005-292685 | 10/2005 |
| JP | 2007-3671 | 1/2007 |

* cited by examiner

*Primary Examiner* — Kendrick Hsu
(74) *Attorney, Agent, or Firm* — Oblon, McClelland, Maier & Neustadt, L.L.P.

(57) ABSTRACT

According to one embodiment, a liquid crystal display panel includes a first substrate, a second substrate, a sealant and a liquid crystal layer. The first substrate includes a switching element and a pixel electrode. The second substrate includes a first organic insulating film in which a first trench portion is formed, a projection formed beneath the first organic insulating film, and a first barrier layer. The first barrier layer is formed continuously from an inside of the first trench portion to under the projection.

13 Claims, 8 Drawing Sheets

LIQUID CRYSTAL DISPLAY PANEL

CROSS-REFERENCE TO RELATED APPLICATIONS

This application is based upon and claims the benefit of priority from Japanese Patent Application No. 2014-257857, filed Dec. 19, 2014, the entire contents of which are incorporated herein by reference.

FIELD

Embodiments described herein relate generally to a liquid crystal display panel.

BACKGROUND

In recent years, display devices such as liquid crystal displays have been used in various fields. A typical liquid crystal display includes a liquid crystal display panel, which comprises a pair of substrates mutually fixed with a sealant, a liquid crystal layer formed in the space surrounded by the pair of substrates and the sealant, etc. Here, a technology of forming a moistureproof film in a liquid crystal display panel is known in order to prevent the entry of moisture from outside into the liquid crystal display panel. The moistureproof film is disposed in each of the side ends of the pair of substrates so as to cover the sealant and the alignment film.

DETAILED DESCRIPTION

In general, according to one embodiment, a liquid crystal display panel comprises: a first substrate comprising a switching element and a pixel electrode electrically connected to the switching element; a second substrate comprising a first organic insulating film located in a peripheral area outside of a display area and including a first trench portion formed therein, a first projection formed beneath the first organic insulating film and projecting downward and a first barrier layer formed continuously from an inside of the first trench portion to under the first projection; a sealant located in the peripheral area and mutually fixing the first substrate and the second substrate; and a liquid crystal layer formed in a space surrounded by the first substrate, the second substrate and the sealant, wherein a degree of water vapor permeation of the first barrier layer is lower than that of the first organic insulating film.

Embodiments and modified examples will now be described with reference to accompanying drawings. Note that the disclosure is presented for the sake of exemplification, and any modification and variation conceived within the scope and spirit of the invention by a person having ordinary skill in the art are naturally encompassed in the scope of invention of the present application. Furthermore, the width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

Figure 1:
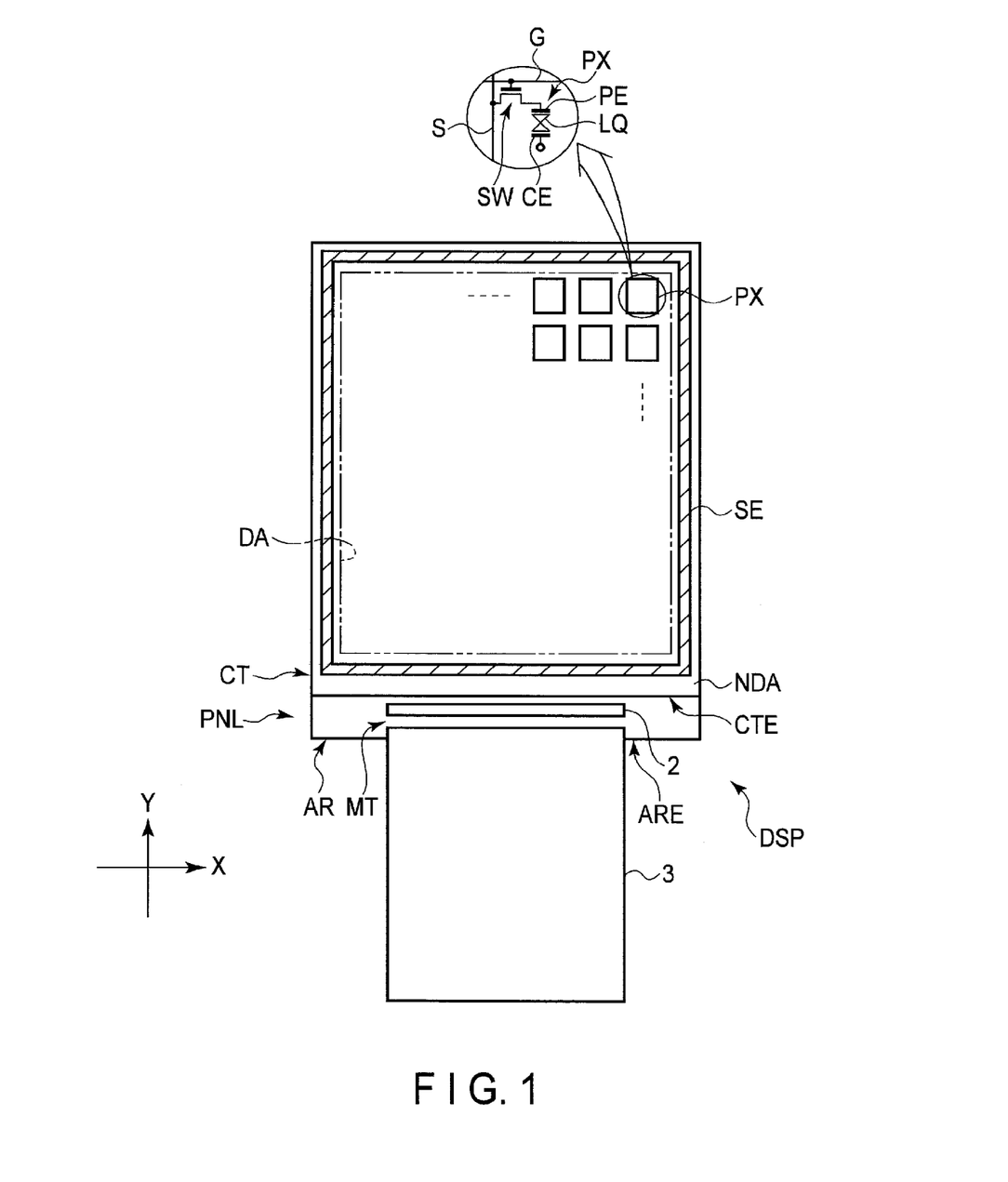
FIG. 1 is a schematic block diagram showing a liquid crystal display according to one embodiment, including an equivalent circuit of a pixel.

First, a liquid crystal display DSP according to an embodiment will now be described in detail. FIG. 1 is a schematic block diagram showing the liquid crystal display DSP according to the embodiment, including an equivalent circuit of a pixel PX.

Here, FIG. 1 shows a plan view of the liquid crystal display panel PNL taken along an X-Y plane defined by a first direction X and a second direction Y crossing each other. In this embodiment, the first direction X and the second direction Y normally cross each other. Note that in this specification, the first direction X and the second direction Y are not particularly limited to those indicated by arrows in the figure, but include directions 180-degrees opposite to those indicated by the arrows.

As shown in FIG. 1, the liquid crystal display panel PNL comprises an array substrate AR, which is a first substrate, a counter substrate CT, which is the second substrates, disposed to oppose the array substrate AR with a predetermined gap therebetween, and a liquid crystal layer LQ held between the array substrate AR and the counter substrate CT. The array substrate AR and the counter substrate CT are fixed mutually by a sealant SE while a predetermined cell gap is formed therebetween. A display area DA configured to display images is located in an inner side of the liquid crystal display panel PNL, surrounded by the sealant SE. The display area DA has, for example, approximately a rectangular shape and a plurality of pixels PX arranged in a matrix are located in the display area DA. Note that the display area DA may have another polygonal shape, and edges thereof may be curved.

The array substrate AR comprises, in the display area DA, scanning lines G extending along the first direction X, signal lines S extending along the second direction Y, switching elements SW electrically connected respectively to the scanning lines G and the signal lines S in respective pixels PX, and pixel electrodes PE electrically connected to the switching elements SW, respectively, in the respective pixels PX, etc. Common electrode CE is provided on at least one of the array substrate AR and the counter substrate CT.

Note that a detailed explanation of the liquid crystal display panel PNL will be omitted, but in a display mode using a vertical electric field along the normal to the major surface of the substrate (X-Y plane), such as a twisted nematic (TN) mode, an optically compensated bend (OCB) mode or a vertical aligned (VA) mode, or in a display mode using a tilted electric field in a direction tilted to the major surface of the substrate, the pixel electrodes PE are provided on the array substrate AR, whereas the common electrode CE is provided on the counter substrate CT. In a display mode using a lateral electric field along the major surface of the substrate, such as an in-plane switching (IPS) mode or a fringe field switching (FFS) mode, the pixel electrodes PE and the common electrode CE are provided on the array substrate AR. Further, the liquid crystal display panel PNL may have a structure adaptable to a display mode which uses the vertical electric field, lateral electric field and titled electric field in an appropriate combination.

The liquid crystal display panel PNL may be constituted as a transmissive type panel, which display images by selectively transmitting light from the backlight unit disposed at the rear side, or a reflective type panel which display images by selectively reflecting external light applied into the liquid crystal display panel PNL. Or it may be constituted as a semi-transmissive type panel, which is a combination of the transmissive and reflective types.

Signal supply sources such as a driver 2 and a flexible substrate 3, necessary to drive the liquid crystal display panel PNL are located in a non-display area NDA which is an outer side of the display area DA. The non-display area NDA is a peripheral area. In the example illustrated, the driver 2 and the flexible substrate 3 are mounted in the mount portion MT of the array substrate AR, extending outward from a substrate end CTE of the counter substrate CT. The mount portion MT is formed along a substrate end ARE of the array substrate AR. The mount portion MT includes pads connected to signal supply sources, which will not be explained in full detail. The pads include those electrically connected to the scanning lines G, the signal lines S, etc., described above. Note that in the example illustrated, the other three substrate ends of the counter substrate CT oppose respectively those of the array substrate AR.

The sealant SE is formed into a frame shape in the non-display area NDA surrounding the display area DA. In the example illustrated, the sealant SE is formed into a rectangular frame shape, and includes a pair of straight-line portions extending along the first direction X and opposing each other via the display area DA and a pair of straight-line portions extending along the second direction Y and opposing each other via the display area DA. The sealant SE can be formed from, for example, a thermal-curing epoxy resin or a photocuring acrylic resin including an ultraviolet curing resin. In the latter case, when the base material of the sealant SE contains an epoxy resin, the adhesion between the sealant SE and the array substrate AR and the adhesion between the sealant SE and the counter substrate CT can be improved.

Figure 2:
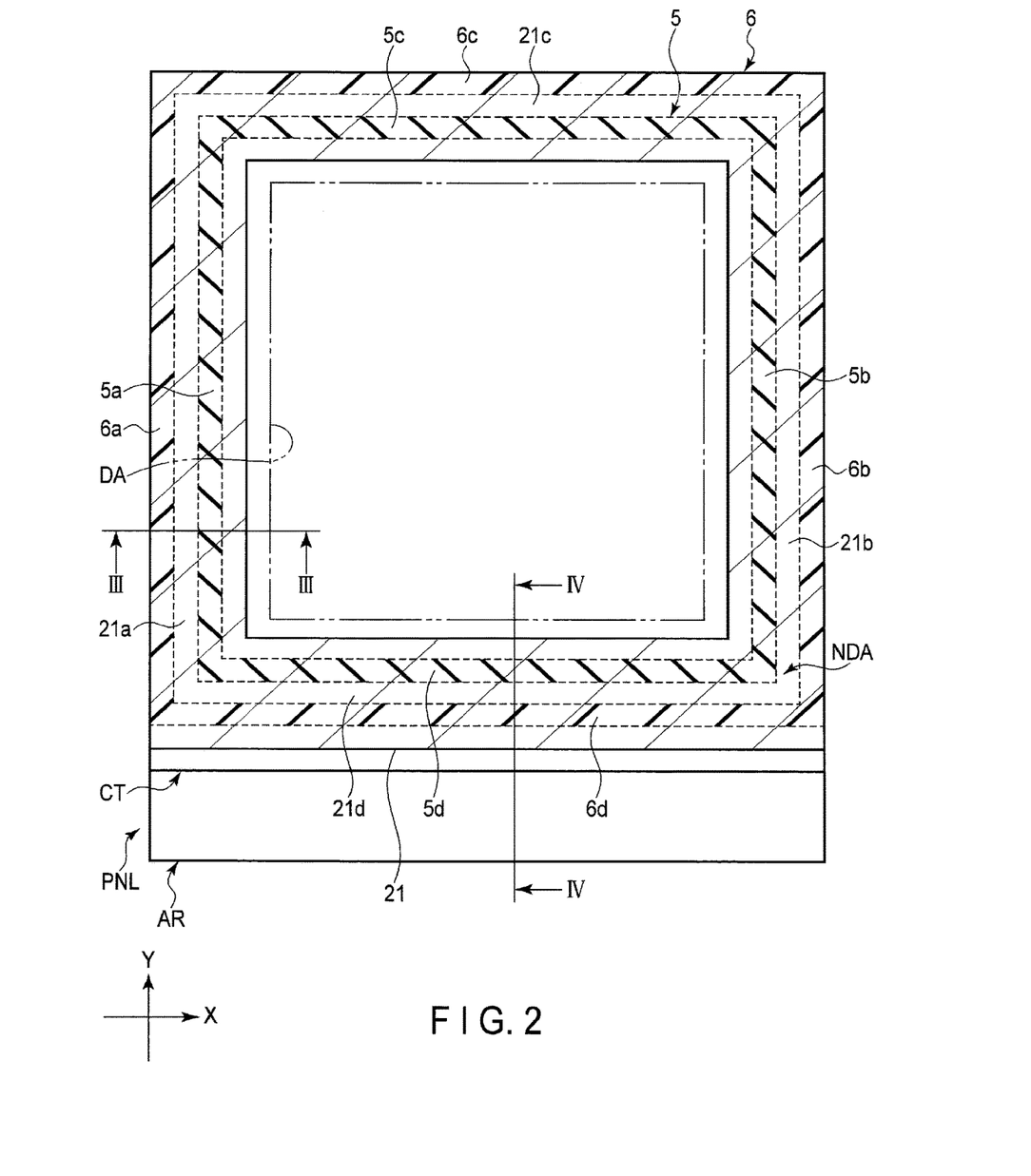
FIG. 2 is a plan view showing a liquid crystal display panel shown in FIG. 1, including an array substrate and a counter substrate including a trench portion, a projection and a barrier layer.

FIG. 2 is a plan view of the liquid crystal display panel PNL of FIG. 1, showing the array substrate AR and the counter substrate CT including a trench portion 5, a projection 6 and a barrier layer 21. FIG. 2 shows positions of the trench portion 5, the projection 6 and the barrier layer 21 with relative to each other in a planer view. In this embodiment, the barrier layer 21 is a first barrier layer and the trench portion 5 is a first trench portion.

As shown in FIG. 2, the counter substrate CT comprises the trench portion 5, the projection 6, the barrier layer 21 and the like. The trench portion 5 is formed in an overcoat layer OC, which will be described later, and is located in the non-display area NDA. The trench portion 5 is formed in a light-shielding layer BM as well, which will be described later. The trench portion 5 is formed continuously over the entire circumference of the non-display area NDA, and includes a straight-line portion 5a and a straight-line portion 5b, extending along the second direction Y, and a straight-line portion 5c and a straight-line portion 5d extending along the first direction X.

The projection 6 is located in the non-display area NDA and formed on an outer side from an outer circumference of the trench portion 5. The projection 6 encloses the display area DA and is formed into a rectangular frame shape. The projection 6 is formed continuously over the entire circumference of the non-display area NDA. The projection 6 includes a straight-line portion 6a and a straight-line portion 6b extending along the second direction Y, and a straight-line portion 6c and a straight-line portion 6d extending along the first direction X. Side surfaces of the straight-line portions 6a to 6c, which constitute an outer circumferential surface of the projection 6, form respective side surfaces of the counter substrate CT and are located on the same plane as corresponding side surfaces of the second insulating substrate 20, which will be described later. Further, the side surfaces of the straight-line portions 6a to 6c, which constitute the outer circumferential surface of the projection 6, are located on the same plane as the side surfaces of the array substrate AR. The straight-line portions 6a to 6c are formed along the substrate end of the counter substrate CT, other than the mount portion shown in FIG. 1. The straight-line portion 6d is formed in a mount portion MT side.

The barrier layer 21 is formed in the non-display area NDA and overlaps the trench portion 5 and the projection 6. The barrier layer 21 is formed continuously from the inside of the trench portion 5 and on the projection 6. The barrier layer 21 encloses the display area DA and is formed into a rectangular frame shape. The barrier layer 21 is formed continuously over the entire circumference of the non-display area NDA. The barrier layer 21 includes a straight-line portion 21a and a straight-line portion 21b extending along the second direction Y, and a straight-line portion 21c and a straight-line portion 21d extending along the first direction X. Side edges of the straight-line portions 21a to 21c, which constitute an outer circumferential edge of the barrier layer 21, are located on the same plane as corresponding side surfaces of the projection 6.

In a plan view, the straight-line portion 21a overlaps the straight-line portion 5a and the straight-line portion 6a. The straight-line portion 21b overlaps the straight-line portion 5b and the straight-line portion 6b. The straight-line portion 21c overlaps the straight-line portion 5c and the straight-line portion 6c. The straight-line portion 21d overlaps the straight-line portion 5d and the straight-line portion 6d.

Figure 3:
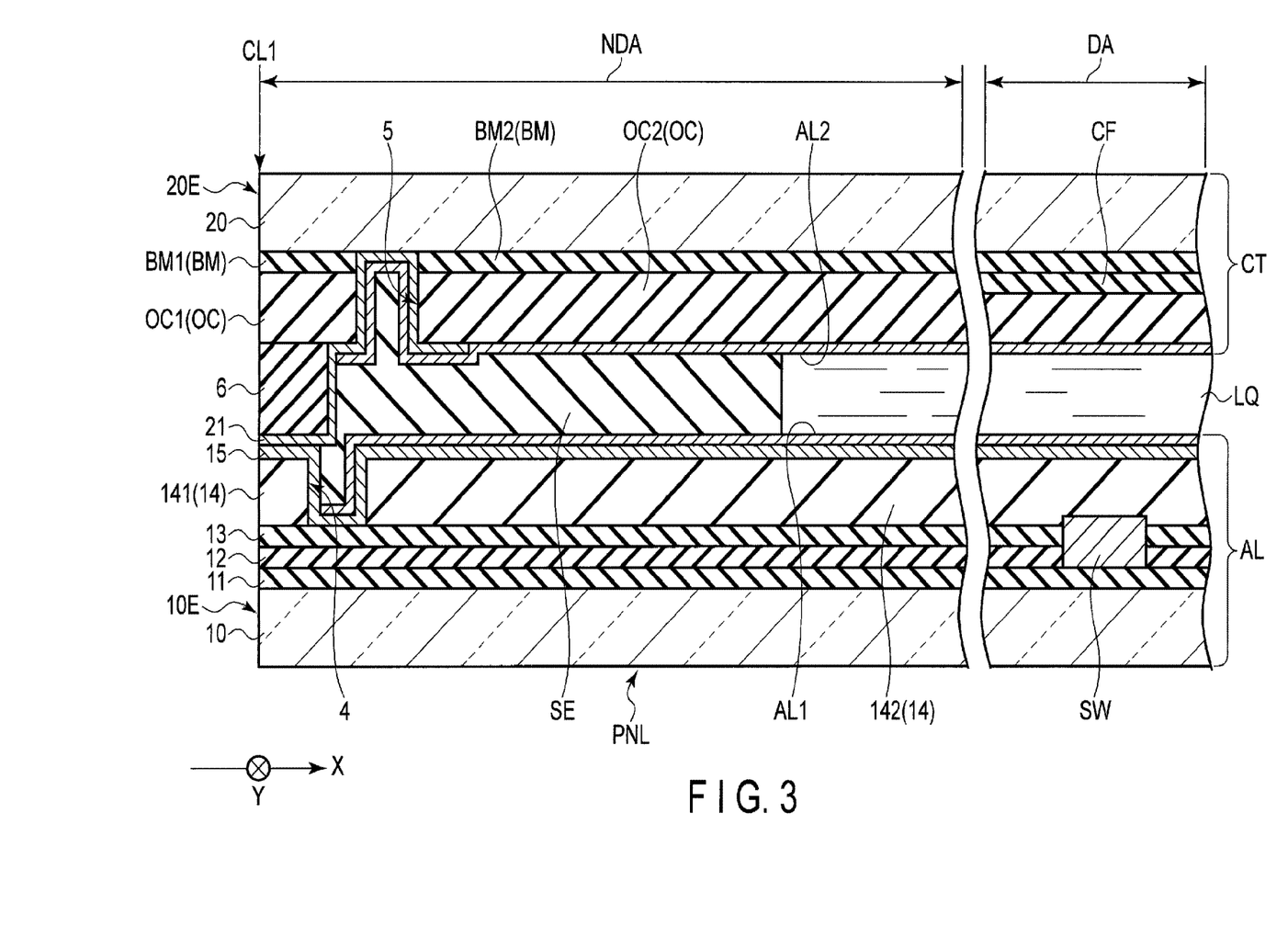
FIG. 3 is a cross-sectional view of the liquid crystal display panel taken along line in FIG. 2.

FIG. 3 is a sectional view of the liquid crystal display panel PNL taken along line III-III of FIG. 2. Note that in FIG. 3, some structural elements of the liquid crystal display panel PNL in the display area DA, such as pixel electrodes PE, may be omitted from the illustration.

In the following descriptions, the direction from the array substrate AR toward the counter substrate CT is defined as an upper direction, whereas the direction from the counter substrate CT toward the array substrate AR is defined as a lower direction. Further, such expressions as "a second component above a first component" and "a second component beneath a first component" mean that the second component may be in contact with the first component or may be located apart from the first component. In the latter case, a third component may be interposed between the first component and the second component. On the other hand, such expressions as "a second component on a first component" and "a second component under a first component" mean that the second component is in contact with the first component.

For example, the second insulating film 12 is formed above the major surface of the first insulating substrate 10. Therefore, the second insulating film 12 may be in contact with the major surface of the first insulating substrate 10 or may be located apart from this major surface. In the latter case, a underlayer protective film is interposed between the major surface and the second insulating film 12.

As shown in FIG. 3, the array substrate AR comprises a first insulating substrate 10, a first insulating film 11, a switching element SW, a second insulating film 12, a third insulating film 13, a fourth insulating film 14, a fifth insulating film 15, a first alignment film AL1 and the like. In this embodiment, the third insulating film 13 is a second inorganic layer, the fourth insulating film 14 is a second organic insulating film, and the fifth insulating film 15 is a second barrier layer. The first insulating substrate 10 is formed from a material with light transmissivity, which be a resin or desirably glass. The first insulating film 11 is formed on the first insulating substrate 10. The switching element SW is formed above the first insulating film 11 in the display area DA. The second insulating film 12 is formed on the first insulating film 11. The third insulating film 13 is formed on the second insulating film 12. The fourth insulating film 14 is formed on the third insulating film 13 so as to cover the switching element SW.

The first insulating film 11, the second insulating film 12 and the third insulating film 13 are equivalent to inorganic insulating films and are formed of, for example, inorganic materials such as silicon oxide (SiO) and silicon nitride (SiN). The fourth insulating film 14 is equivalent to an organic insulating film and is formed of an organic material such as one of various types of resins.

In the example illustrated, the first insulating film 11, the second insulating film 12 and the third insulating film 13 extend from the display area DA to a side edge 10E of the first insulating substrate 10. The trench portion 4 is formed in the fourth insulating film 14. The fourth insulating film 14 is divided into a first segment 141 located on the side edge 10E side and a second segment 142 located on the display area DA side.

The fifth insulating film 15 is formed continuously onto the fourth insulating film 14 and to the inside of the trench portion 4. The fifth insulating film 15 is formed continuously from the display area DA over to the non-display area NDA. The fifth insulating film 15 is formed substantially continuously over the entire circumference of the non-display area NDA. The fifth insulating film 15 is in contact with the third insulating film 13 inside the trench portion 4. The fifth insulating film 15 is equivalent to, for example, in a structure that the array substrate AR comprises the pixel electrodes PE and the common electrode CE, an interlayer insulating film interposed between the pixel electrodes PE and the common electrode CE. Here, the fifth insulating film 15 and the interlayer insulating film may be formed of the same material, and may be formed continuously or apart from each other.

The fifth insulating film 15 is equivalent to an inorganic insulating film, and formed of, for example, an inorganic material such as silicon nitride (SiN). The fifth insulating film 15 is a moisture barrier film (moisture barrier layer), and configured to inhibit passage of moisture. In the following descriptions, the degree of water vapor permeation defined in Japanese Industrial Standard (JIS) K 7129 is used. The degree of water vapor permeation indicates the degree of water vapor permeation per unit volume. The degree of water vapor permeation of the fifth insulating film 15 is lower than that of the fourth insulating film 14. In other words, the fifth insulating film 15 is formed of a material by which the moisture is not allowed to pass more easily than that of the fourth insulating film 14. With this structure, the permeation of moisture from the outside of the liquid crystal display panel PNL to the inside (for example, the liquid crystal layer LQ) is inhibited by the fifth insulating film 15.

The first alignment film AL1 is formed on the fifth insulating film 15 so as to be in contact with the liquid crystal layer LQ.

On the other hand, the counter substrate CT comprises a second insulating substrate 20, a light-shielding layer BM, a color filter CF, an overcoat layer OC, a projection 6, a barrier layer 21, a second alignment film AL2 and the like. In this embodiment, the second insulating substrate 20 is a first inorganic matter layer and the barrier layer 21 is a first barrier layer. The second insulating substrate 20 is formed from a material with light transmissivity, such as a glass substrate or a resin substrate.

The light-shielding layer BM is formed on a side opposing the array substrate AR of the second insulating substrate 20. The light-shielding layer BM is formed so as to divide into each pixel may as a compartment in the display area DA, though will not be explained in full detail. Further, the light-shielding layer BM extends over the non-display area NDA substantially in its entirety. The light-shielding layer BM is formed from, for example, a material in which carbon black is mixed into an acrylic resin.

The color filter CF is formed on a side opposing the array substrate AR of the second insulating substrate 20 in the display area DA. The color filter CF is formed of a colored resin material. Note that the color filter CF may be provided not on a counter substrate CT, but on an array substrate AR.

The overcoat layer OC covers the color filter CF and the light-shielding layer BM. The overcoat layer OC is formed of a transparent acrylic resin material.

In this embodiment, the light-shielding layer BM and the overcoat layer OC functions as a first organic insulating film. The trench portion 5 is formed through each of the light-shielding layer BM and the overcoat layer OC. The light-shielding layer BM and the overcoat layer OC are interrupted by the trench portion 5 in the non-display area NDA. That is, the light-shielding layer BM is divided into a first segment BM1 located on a side edge 10E side and a second segment BM2 extending toward a display area DA side in the non-display area NDA. The overcoat layer OC is divided into a first segment OC1 located on the side edge 10E side and a second segment OC2 extending toward the display area DA side in the non-display area NDA. Note that the trench portion 5 may be formed in one manufacturing step, or may be formed two or more manufacturing steps. For example, the trench portion 5 may be formed by the first step of piercing through the light-shielding layer BM and the second step of piercing through the overcoat layer OC.

In the example illustrated, the liquid crystal display panel PNL further comprises a projection 6 interposed between the array substrate AR and the counter substrate CT. The projection 6 is located in the non-display area NDA, and provided beneath the overcoat layer OC to be in contact with the overcoat layer OC and to project to the array substrate AR side. The projection 6 projects downward and is formed into a wall shape. The projection 6 is formed of, for example, a material contains an acrylic resin as a base.

The barrier layer 21 is formed continuously to beneath the projection 6 from the inside of the trench portion 5. In this embodiment, the barrier layer 21 is in contact with a surface of the projection 6, which opposes the array substrate AR, so as to cover the trench portion 5. The barrier layer 21 is formed continuously to beneath the second insulating substrate 20 which forms the trench portion 5, on wall surfaces of the light-shielding layer BM, which form the trench portion 5, on wall surfaces of the overcoat layer OC, which form the trench portion 5 and beneath the surface of the overcoat layer OC, which encloses the trench portion 5. The barrier layer 21 is in contact with the second insulating substrate 20 inside the trench portion 5. The barrier layer 21 is a moisture barrier layer and configured to inhibit passage of moisture. The degree of water vapor permeation of the barrier layer 21 is lower than that of the overcoat layer OC. For the overcoat layer OC, an organic layer of bisarylfluorene acrylate or the like can be used. That is, the barrier layer 21 is formed of a material which does not allow moisture to pass more easily than does the overcoat layer OC. With this structure, permeation of moisture from the outside of the liquid crystal display panel PNL to the inside (for example, the liquid crystal layer LQ) is inhibited by the barrier layer 21.

The barrier layer 21 is in contact with the fifth insulating film 15 beneath (immediately under) the projection 6. In this embodiment, the barrier layer 21 is in contact with the fifth insulating film 15 over its entire circumference. In this case, permeation of moisture from the outside of the liquid crystal display panel PNL to the inside (for example, the liquid crystal layer LQ) can be prevented by the barrier layer 21 and the fifth insulating film 15.

Examples of the material which forms the barrier layer 21 are metal oxides such as silicon oxide (SiO), zinc oxide (ZnO) and tin oxide (SnO), metal nitrides such as silicon nitride (SiN) and aluminum nitride (AlN), polysiloxane containing a siloxane bond (Si—O—Si bond), and fluororesin compounds such as polytetrafluoroethylene (PTFE), tetrafluoroethylene-perfluoroalkylvinylether copolymer (PFA), a tetrafluoroethylene-hexafluoropropylene copolymer (FEP), a tetrafluoroethylene-ethylene copolymer (ETFE), polyvinylidene fluoride (PVDF) and polychlorotrifluoroethylene (PCTFE), etc. The degree of water vapor permeation of the barrier layer 21 is lower than any of those of the light-shielding layer BM, the overcoat layer OC and the projection 6, which are formed of an acrylic resin, or that of an alignment film (for example, the second alignment film AL2).

The second alignment film AL2 is formed under the overcoat layer OC and partially overlaps the barrier layer 21. The second alignment film AL2 is in contact with the liquid crystal layer LQ. The liquid crystal layer LQ is formed in a space surrounded by the array substrate AR, the counter substrate CT and the sealant SE.

A liquid crystal display panel PNL including an array substrate AR and a counter substrate CT can be prepared by, for example, mutually fixing a first mother board to form a plurality of array substrates AR and a second mother board to form a plurality of counter substrates CT by a sealant SE, and thereafter cutting it down on a cut line (scribe line). In FIG. 3, the array substrate AR and the counter substrate CT are cut out along a cut line CL1. With this procedure, the projection 6 and the like are formed to be divided.

Figure 4:
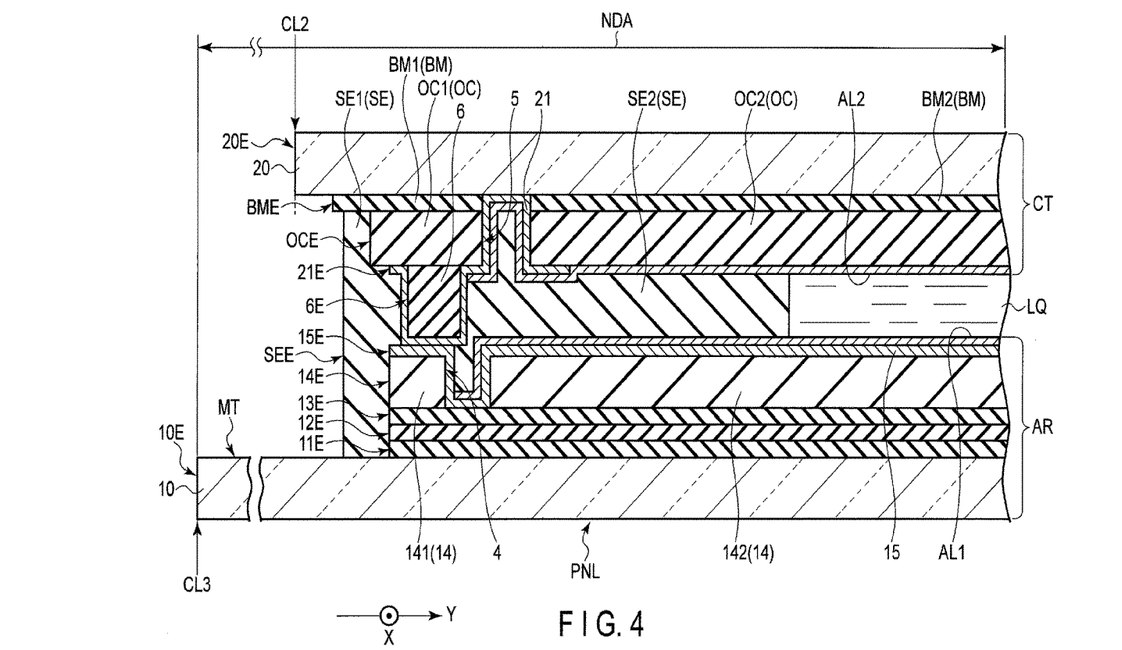
FIG. 4 is a cross-sectional view showing the liquid crystal display panel taken along line IV-IV in FIG. 2.

FIG. 4 is a cross-sectional view of the liquid crystal display panel PNL taken along line IV-IV shown in FIG. 2. In FIG. 4, the advancing side in the second direction Y is equivalent to an inner side of the liquid crystal display panel PNL and the retrogressing side of the second direction Y is equivalent to an outer circumferential side of the liquid crystal display panel PNL. In FIG. 3, the cut line CL1 for cutting down the liquid crystal display panel PNL passes through the projection 6, whereas in FIG. 4, cut lines CL2 and CL3 pass through on an outer circumferential side from the projection 6.

As shown in FIG. 4, a side edge 11E of the first insulating film 11, a side edge 12E of the second insulating film 12, a side edge 13E of the third insulating film 13, a side edge 14E of the fourth insulating film 14 and a side edge 15E of the fifth insulating film 15 are formed on an outer circumferential side of the liquid crystal display panel PNL from a side edge 6E of the projection 6. Note here that the positions of the side edges of these may be changed in various ways. For example, the first insulating film 11, the second insulating film 12, the third insulating film 13, and the interconnects (not shown) may be formed to extend to the mount portion MT. A side edge SEE of the sealant SE is formed on an outer circumferential side of the liquid crystal display panel PNL from the side edge OCE of the overcoat layer OC, but on an inner side of the liquid crystal display panel PNL from the side edge BME of the light-shielding layer BM. The side edge 20E of the second insulating substrate 20 is formed on an outer circumferential side of the liquid crystal display panel PNL from the side edge BME of the light-shielding layer BM, but on an inner side of the liquid crystal display panel PNL from the side edge 10E of the first insulating substrate 10.

The sealant SE is interrupted by the projection 6. That is, sealant SE is divided into a first segment SE1 located in a side edge 10E side and a second segment SE2 located on a display area DA side in the non-display area NDA. Note that the positions of the side edge SEE, the side edge OCE and the side edge BME can be changed in various ways.

In FIG. 4, the counter substrate CT is prepared by cutting out along the cut line CL2. The array substrate AR is prepared by cutting out along the cut line CL3. That is, the cut lines for the array substrate AR and the counter substrate CT are displaced from each other in a mount portion MT side in order to reserve the area for the mount portion MT on the array substrate AR.

According to the liquid crystal display DSP with the above-described structure of this embodiment, the trench portion 5 is formed in the light-shielding layer BM and the overcoat layer OC. The projection 6 is formed beneath the overcoat layer OC. The barrier layer 21 is formed continuously to under the projection 6 from the inside of the trench portion 5. The barrier layer 21 has properties of inhibiting passage of moisture. The degree of water vapor permeation of the barrier layer 21 is lower than that of the overcoat layer OC and that of the light-shielding layer BM. Thus, the moisture permeating the overcoat layer OC, the light-shielding layer BM and the projection 6, which are organic insulating films, the moisture permeating along the interface between the overcoat layer OC and the light-shielding layer BM, and the moisture permeating along the interface between the overcoat layer OC and the projection 6 can be inhibited from entering the display area DA (liquid crystal layer LQ) side by the barrier layer 21.

With this structure, defects which may occur if moisture enters the display area DA (liquid crystal layer LQ) side can be prevented. An example of such a defect is a situation in which the voltage retention rate of the liquid crystal layer LQ falls to cause misalignment in the liquid crystal layer LQ.

If misalignment occurs in the liquid crystal layer LQ, display errors such as non-uniformity of black regions in a display image occur, degrading display quality. Another example of such a defect is a situation in which the interconnects and/or electrodes may become corroded. As described above, since the barrier layer 21 can block the permeation path of moisture and the like, it is possible to obtain a liquid crystal display panel PNL which can inhibit invasion of moisture, thereby improving its reliability.

In this embodiment, the trench portion 5 is made through the light-shielding layer BM and the overcoat layer OC. The overcoat layer OC is divided into a first segment OC1 and a second segment OC2 by the trench portion 5. The light-shielding layer BM is divided into a first segment BM1 and a second segment BM2 by the trench portion 5. The barrier layer 21 is in contact with the second insulating substrate 20 inside the trench portion 5. The barrier layer 21 can inhibit the entry of the moisture permeating the interface between the second insulating substrate 20 and the light-shielding layer BM into the display area DA (liquid crystal layer LQ) side as well. With this structure, it is possible to obtain liquid crystal display panel PNL which can further inhibit the entry of moisture, thereby further improving the reliability.

Moreover, in the array substrate AR, the fourth insulating film (second organic insulating film) 14 include a trench portion 4. The fifth insulating film (second barrier layer) 15 is formed continuously to on the fourth insulating film 14 from inside of the trench portion 4. The fifth insulating film 15 has properties of inhibiting passage of moisture. The degree of water vapor permeation of the fifth insulating film 15 is lower than that of the fourth insulating film 14. With this structure, the entry of the moisture permeating the fourth insulating film 14 to the display area DA (liquid crystal layer LQ) side can be inhibited by the fifth insulating film 15. Thus, it is possible to obtain a liquid crystal display panel PNL which can further inhibit the entry of moisture, thereby further improving its reliability.

In this embodiment, the trench portion 4 is made through the fourth insulating film 14. The fourth insulating film 14 is divided into a first segment 141 and a second segment 142 by the trench portion 4. Further, the fifth insulating film 15 is in contact with the third insulating film 13 inside the trench portion 4. The fifth insulating film 15 can further inhibit the entry of moisture permeating the interface between the third insulating film 13 and the fourth insulating film 14 into the display area DA (liquid crystal layer LQ) side. With this structure, the entry of moisture from the outside of the liquid crystal display panel PNL to the display area DA side can be further inhibited also in the array substrate AR, and thus it is possible to obtain the liquid crystal display panel PNL with a higher reliability.

Further, according to this embodiment, the projection part 6 is interposed between the array substrate AR and the counter substrate CT in the non-display area NDA. The height of the projection 6 is adjusted so as to be able to retain the gap between the array substrate AR and the counter substrate CT by the projection 6. The barrier layer 21 is in contact with the fifth insulating film 15 beneath (right under) the projection 6. The barrier layer 21 and fifth insulating film 15 can serve these interfaces to make it difficult for moisture to permeate. Thus, the entry of moisture can be further inhibited, and it is possible to obtain the liquid crystal display panel PNL with even higher reliability.

Moreover, as shown in FIG. 3, the projection 6 is located on the cut line CL1 of the first mother board and the second mother board, whereas no sealant SE is located thereon. Since the external stress applied during cutting is concentrated toward the projection 6, cutting error of mother boards can be suppressed.

FIRST MODIFIED EXAMPLE

Figure 5:
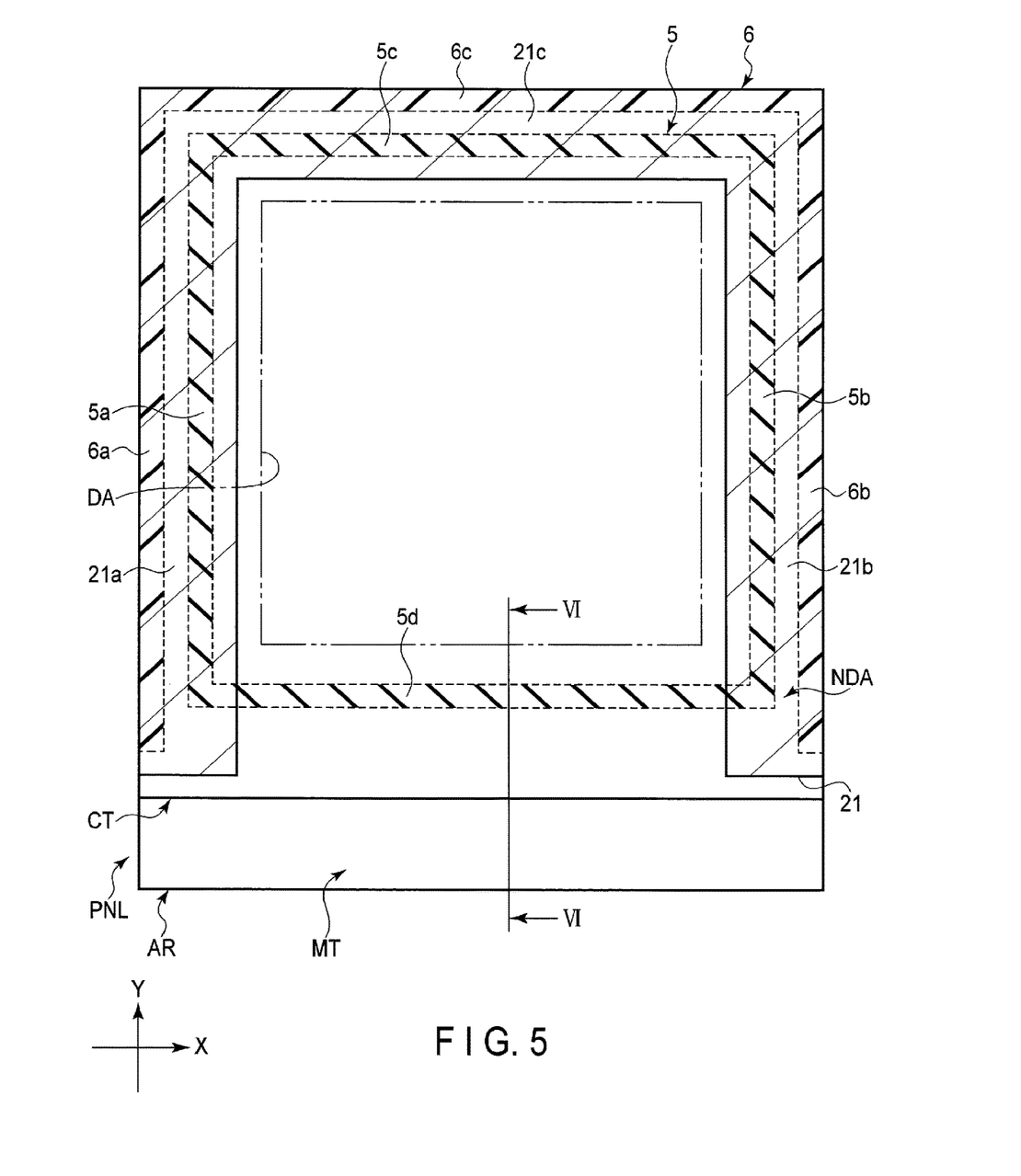
FIG. 5 is a plan view showing a first modified example of the liquid crystal display panel according to the embodiment, including an array substrate and a counter substrate including a trench portion, a projection and a barrier layer.
Figure 6:
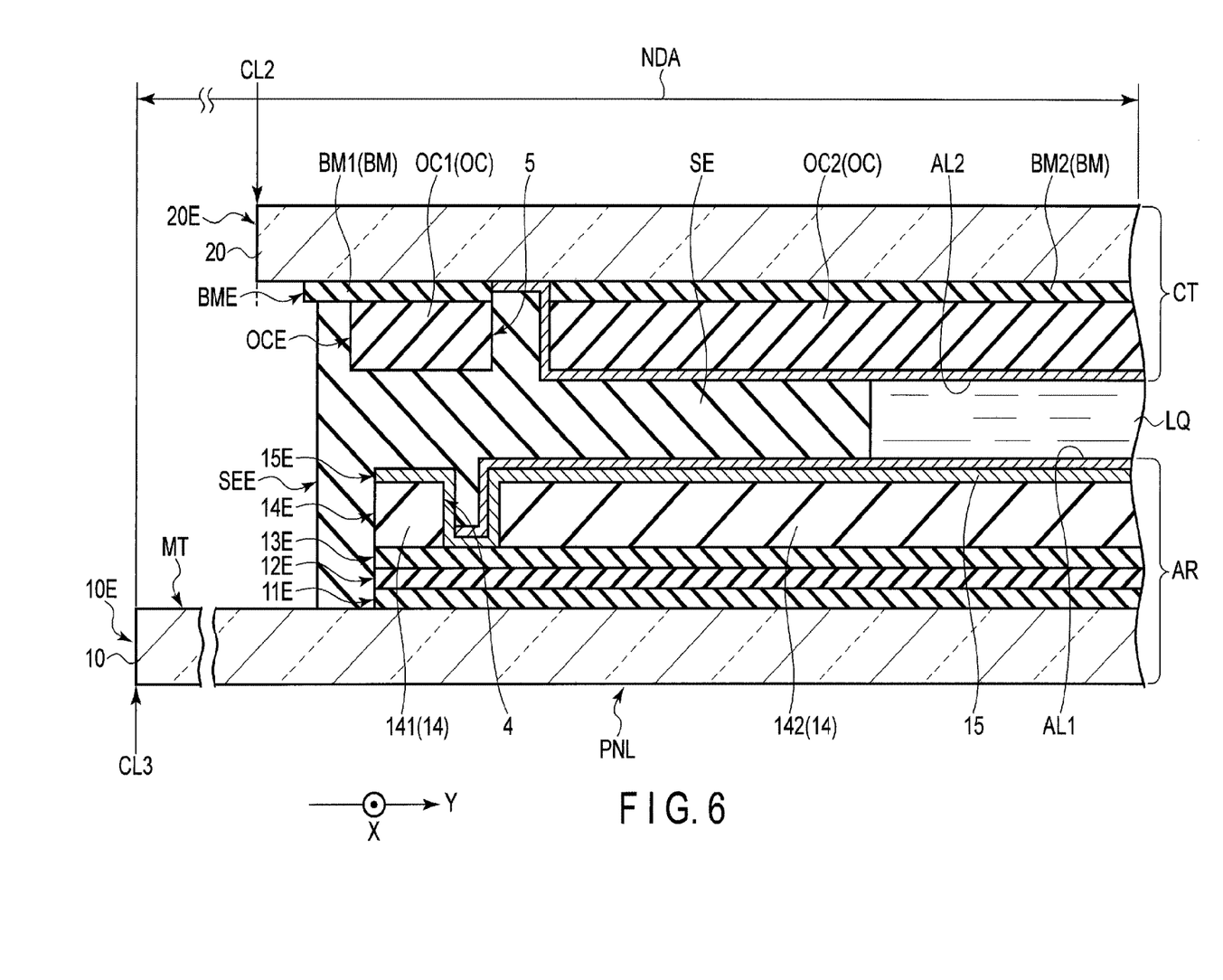
FIG. 6 is a cross-sectional view of the liquid crystal display panel taken along line VI-VI in FIG. 5.

Next, the first modified example of the liquid crystal display panel PNL according to the embodiment described above will be described. FIG. 5 is a plan view of the first modified example of the liquid crystal display panel PNL according to in the embodiment, showing an array substrate AR and a counter substrate CT including a trench portion 5, a projection 6 and a barrier layer 21. FIG. 6 is a cross-sectional view of the liquid crystal display panel PNL taken along line VI-VI shown in FIG. 5.

As shown in FIGS. 5 and 6, as the first modified example is compared with the embodiment described above, it is different in that the projection 6 includes, not four straight-line portions 6a to 6d, but three straight-line portions 6a to 6c. Further, the first modified example is different from the embodiment in that the barrier layer 21 includes, not four straight-line portions 21a to 21d, but the three straight-line portions 21a or 21c. In other words, the straight-line portion 6d of the projection 6 and the straight-line portion 21d of the barrier layer 21 are not formed in the first modified example. Note that the projection 6 and/or the barrier layer 21 need not to be formed continuously.

In the first modified example also, the penetration of moisture into the liquid crystal display panel PNL can be inhibited in the three sides of the liquid crystal display panel PNL, where the straight-line portions 6a to 6c of the projection part 6 and the straight-line portions 21a to 21c of the barrier layer 21 are formed.

SECOND MODIFIED EXAMPLE

Figure 7:
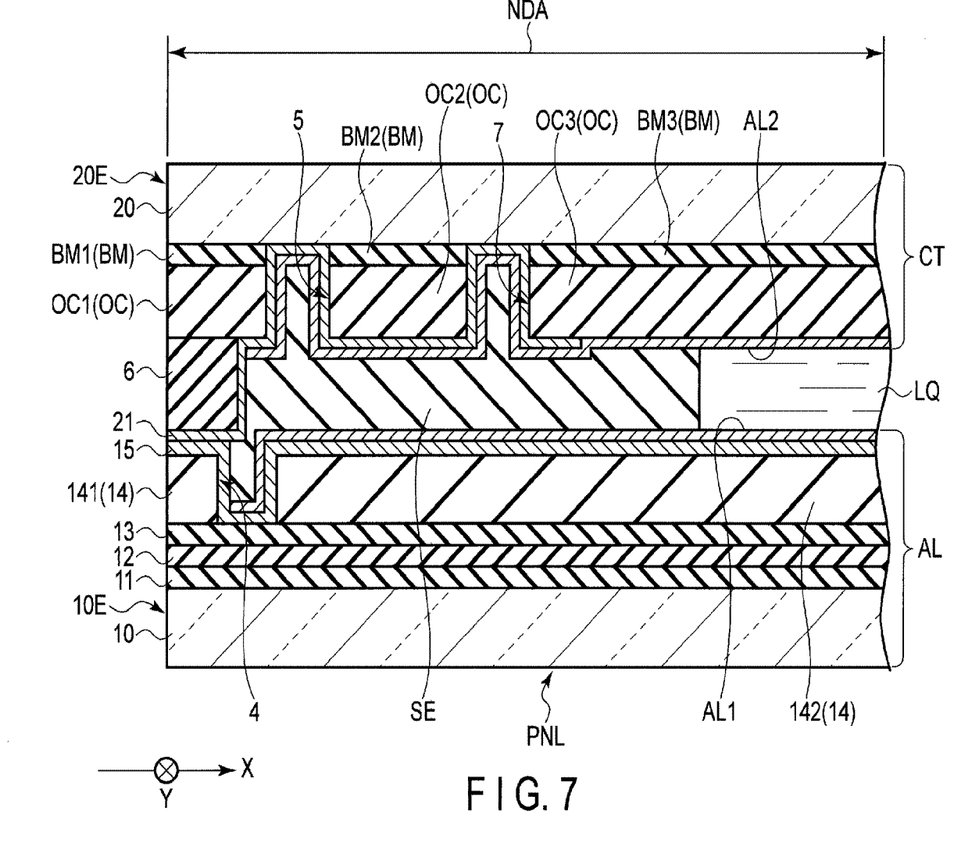
FIG. 7 is a cross-sectional view of a first modified example of the liquid crystal display panel according to the embodiment.

FIG. 7 is a cross-sectional view showing the second modified example of the liquid crystal display panel PNL according to the embodiment described above. As compared to the above-described embodiment (FIG. 3), the second modified example is different in that the counter substrate CT includes, not one trench portion, but a plurality of trench portions.

As shown in FIG. 7, in the second modified example, the counter substrate CT includes two trench portions. That is, the counter substrate CT includes a trench portion 7 in addition to the trench portion 5 described above. The trench portion 7 is located on the display area DA side with respect to the trench portion 5. The trench portion 7 is made through each of the light-shielding layer BM and the overcoat layer OC. The light-shielding layer BM and the overcoat layer OC are interrupted by the trench portion 5 and the trench portion 7 in the non-display area NDA. That is, the light-shielding layer BM is divided into a first segment BM1 located on the side edge 10E side, a third segment BM3 located on the display area DA side with respect to the first segment BM1, and a second segment BM2 located between the first segment BM1 and the third segment BM3 in the non-display area NDA. The overcoat layer OC is divided into a first segment OC1 located on the side edge 10E side, a third segment OC3 located on the display area DA side with respect to the first segment OC1, and a second segment OC2 located between the first segment OC1 and the third segment OC3 in the non-display area NDA. Note that the trench portion 7 can be formed by a manufacturing step similar to that of the trench portion 5.

The barrier layer 21 is formed continuously from the inside of the trench portion 7 through the inside of the trench portion 5 to beneath the projection part 6. In the second modified example, the barrier layer 21 is in contact with a surface of the projection 6, which opposes the array substrate AR, so as to cover each of the trench portion 5 and the trench portion 7.

The barrier layer 21 is formed continuously under the second insulating substrate 20 which forms the trench portion 5, on wall surfaces of the light-shielding layer BM, which form the trench portion 5, on wall surfaces of the overcoat layer OC, which form the trench portion 5, under the second insulating substrate 20 which forms the trench portion 7, wall surfaces of the light-shielding layer BM, which form the trench portion 7, wall surfaces of the overcoat layer OC, which form the trench portion 7 and under the surface of the overcoat layer OC which encloses each of the trench portion 5 and the trench portion 7. The barrier layer 21 is in contact with the second insulating substrate 20 inside both the trench portion 5 and the trench portion 7. With this structure, the second modified example can better suppress the entry of moisture from the outside of the liquid crystal display panel PNL to the inside (for example, liquid crystal layer LQ) than the embodiment described above.

According to the second modified example described above, an effect similar to that of the embodiment can be obtained. In to the second modified example, a liquid crystal display panel PNL more reliable than that of the above-described embodiment can be obtained.

Note that it suffices if the trench portion 7 is formed at least partially on the non-display area NDA. For example, the trench portion 7 may be formed continuously over the entire circumference of the non-display area NDA, or intermittently over the entire circumference of the non-display area NDA or on one side of the non-display area NDA.

THIRD MODIFIED EXAMPLE

Figure 8:
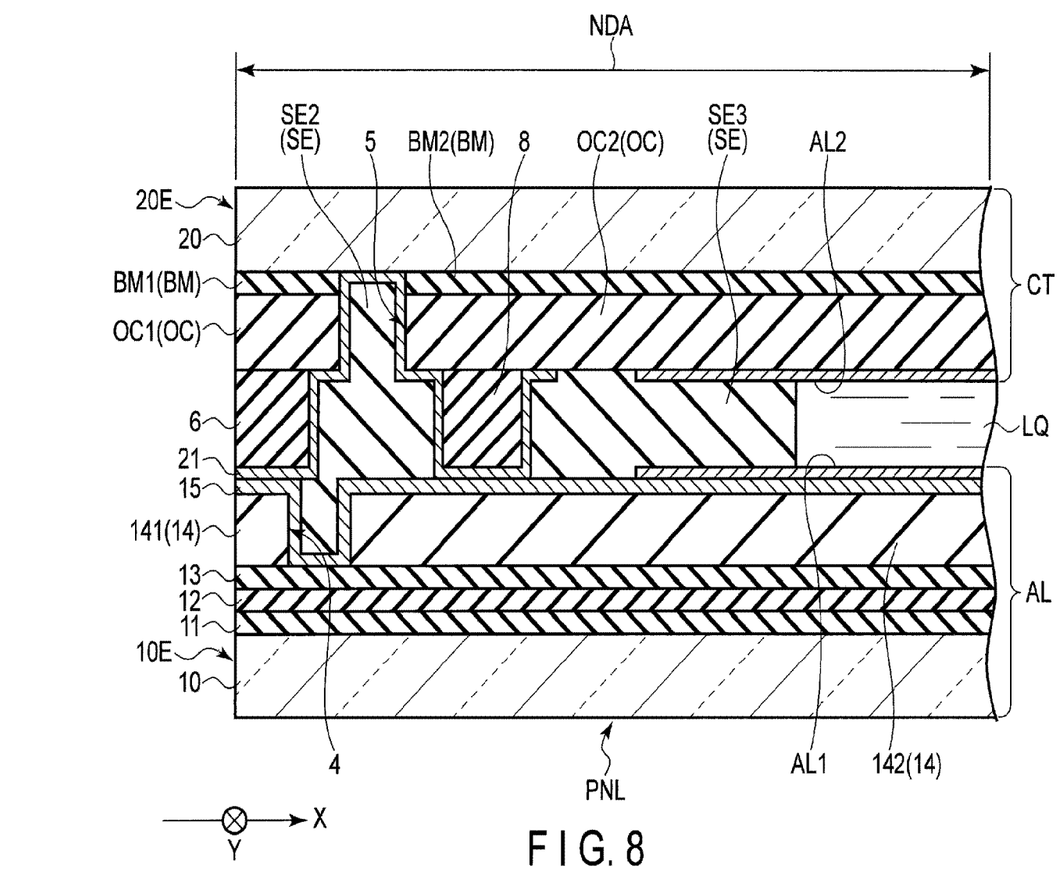
FIG. 8 is a cross-sectional view of a third modified example of the liquid crystal display panel according to the embodiment.

FIG. 8 is a cross sectional view showing the third modified example of the liquid crystal display panel PNL according to the embodiment described above. In the third modified example, the counter substrate CT includes a projection 8 in addition to the projection 6 described above. The projection 8 is located in the non-display area NDA on the display area DA side with respect to the projection part 6. The projection 8 is located beneath the overcoat layer OC and is in contact with the overcoat layer OC. The projection 8 projects downward.

The sealant SE is interrupted by the projection 8 in the non-display area NDA. That is, the sealant SE is divided into a second segment SE2 located in a substrate edge portion 10E side and a third segment SE3 extending toward the display area DA side in the non-display area NDA.

The barrier layer 21 is formed continuously from under the projection 6 through the inside of the trench portion 5 to under the projection 8. In the third modified example, the barrier layer 21 covers the projection 8. The barrier layer 21 is in contact with a surface of the projection 6, which opposes the array substrate AR, and is in contact with a surface of the projection 8, which opposes the array substrate AR.

The barrier layer 21 is in contact with the fifth insulating film 15 in the lower part of the projection 8. With this structure, the third modified example can better suppress the invasion of moisture from the outside of the liquid crystal display panel PNL to the inside (for example, liquid crystal layer LQ) than the embodiment described above.

According to the third modified example described above, an effect similar to that of the embodiment can be obtained.

It suffices if the projection 8 is formed at least partially on the non-display area NDA. For example, the projection 8 may be formed continuously over the entire circumference of the non-display area NDA, or intermittently over the entire circumference of the non-display area NDA or on one side of the non-display area NDA. Moreover, the counter substrate CT may include three or more projections.

Note that an embodiment and modified examples described above are presented for the sake of exemplification, and are not intended to limit the scope of the technology discussed. These novel embodiments can be carried out in various other modes, in which various omissions, substitutions and variations may be carried out within the scope and spirit of the technology. Such changes and modifications are encompassed by the scope and spirit of the technology, and naturally fall within the scope and its equivalency of the technology recited in the claims.

For example, the first organic insulating film is not limited to the light-shielding layer BM and the overcoat layer OC and can be modified variously. When the light-shielding layer BM is formed from a metal such as chromium, nickel or aluminum or from a vapor deposition film of a metallic compound, as an inorganic film, the first organic insulating film may be formed of only the overcoat layer OC. In this case, the trench portions 5 and 7 should be formed only in the overcoat layer OC. Further, the trench portions 5 and 7 may not be formed through the first organic insulating film. Furthermore, the trench portions 5 and 7 may be formed in plural segments intermittently over the entire circumference of the non-display area NDA, or may not be formed over the entire circumference of the non-display area NDA. In these cases, it suffices if the form of the barrier layer 21 corresponds to that of the trench portions 5 and 7, and it needs not be in contact with the second insulating substrate 20.

The trench portion 4 need not be formed through the fourth insulating film 14. The trench portion 4 may be formed in plural segments intermittently over the entire circumference of the non-display area NDA, or may not be formed over the entire circumference of the non-display area NDA. In these cases, it suffices if the form of the fifth insulating film 15 corresponds to that of the trench portion 4, and it needs not be in contact with the third insulating film 13.

The first organic insulating film, unlike the light-shielding layer BM or the overcoat layer OC, may be located in the non-display area NDA and formed from an insulating film which uses an organic material.

The first inorganic layer is not limited to the second insulating substrate 20, but may be modified variously. For example, the first inorganic layer may be an inorganic film formed under the second insulating substrate 20 using an inorganic material.

The first alignment film AL1 and the second alignment film AL2 may be horizontal alignment films or vertical alignment films. The alignment process carried out on a horizontal alignment film is, for example, a rubbing or optical alignment process.

Moreover, the embodiment and modifications are not limited to the liquid crystal displays described above, and can be applied to various kinds of liquid crystal displays. In addition, it is only natural that the embodiment and modifications are applicable to those from medium- or small-sized display devices to large-sized display devices without any particular limitations.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display panel comprising:
a first substrate comprising a switching element and a pixel electrode electrically connected to the switching element;
a second substrate comprising a first organic insulating film located in a peripheral area outside of a display area and including a first trench portion formed therein, a first projection formed beneath the first organic insulating film and projecting downward, a first barrier layer formed from an inside of the first trench portion continuously to under the first projection, and an alignment film covering the first barrier layer inside the first trench portion;
a sealant located in the peripheral area and mutually fixing the first substrate and the second substrate; and
a liquid crystal layer formed in a space surrounded by the first substrate, the second substrate and the sealant,
wherein a degree of water vapor permeation of the first barrier layer is lower than that of the first organic insulating film,
the first organic insulating film further includes an overcoat layer and a light-shielding layer, and
the first trench portion is formed in the light-shielding layer and the overcoat layer.

2. The liquid crystal display panel of claim 1, wherein the second substrate comprises a first insulating substrate, the light-shielding layer is formed between the first insulating substrate and the overcoat layer, and
the first barrier layer is in contact with the first insulating substrate inside the first trench portion.

3. The liquid crystal display panel of claim 2, wherein the first barrier layer is in contact with the first substrate beneath the first projection.

4. The liquid crystal display panel of claim 2, wherein the first trench portion, the first projection and the first barrier layer are formed continuously over an entire circumference of the peripheral area.

5. The liquid crystal display panel of claim 2, wherein
the first substrate comprises a second organic insulating film located in the peripheral area and including a second trench portion formed therein, and a second barrier layer formed from an inside of the second trench portion continuously to on the second organic insulating film,
a degree of water vapor permeation of the second barrier layer is lower than that of the second organic insulating film, and
the first barrier layer is in contact with the second barrier layer beneath the first projection.

6. The liquid crystal display panel of claim 5, wherein
the first substrate comprises a second insulating substrate,
the second organic insulating film is formed on the second insulating substrate,
the second trench portion is formed through the second organic insulating film, and
the second barrier layer is in contact with the second insulating substrate inside the second trench portion.

7. The liquid crystal display panel of claim 5, wherein the first substrate further comprises a common electrode opposing the pixel electrode, and an interlayer insulating film formed between the pixel electrode and the common electrode, and
the second barrier layer is formed of a same material as that of the interlayer insulating film.

8. The liquid crystal display panel of claim 5, wherein the first organic insulating film further comprises a third trench portion formed therein, and the first barrier layer is formed continuously from an inside of the third trench portion to the inside of the first trench portion.

9. The liquid crystal display panel of claim 8, wherein the second substrate further comprises a second projection formed beneath the first organic insulating film and projecting downward, and the first barrier layer is formed continuously from the inside of the first trench portion to under the second projection.

10. The liquid crystal display panel of claim 8, wherein the second barrier layer is formed of silicon nitride.

11. The liquid crystal display panel of claim 2, wherein an outer circumferential surface of the first projection constitutes a side surface of the second substrate and is formed on a same plane as a side surface of the first substrate.

12. The liquid crystal display panel of claim 1, wherein the first barrier layer is formed of metal oxides such as silicon oxide (SiO), zinc oxide (ZnO) and tin oxide (SnO), metal nitrides such as silicon nitride (SiN) and aluminum nitride (AlN), and polysiloxane containing a siloxane bond (Si—O—Si bond).

13. The liquid crystal display panel of claim 1, wherein the first barrier layer is formed of fluororesin compounds such as polytetrafluoroethylene(PTFE), tetrafluoroethylene-perfluoroalkylvinylether copolymer (PFA), a tetrafluoroethylene -hexafluoropropylene copolymer (FEP), a tetrafluoroethylene-ethylene copolymer (ETFE), polyvinylidene fluoride (PVDF) and polychlorotrifluoroethylene (PCTFE).

* * * * *